O. ANDERSON.
MILKING MACHINE.
APPLICATION FILED NOV. 1, 1912.
1,113,942.
Patented Oct. 20, 1914.
6 SHEETS—SHEET 2.
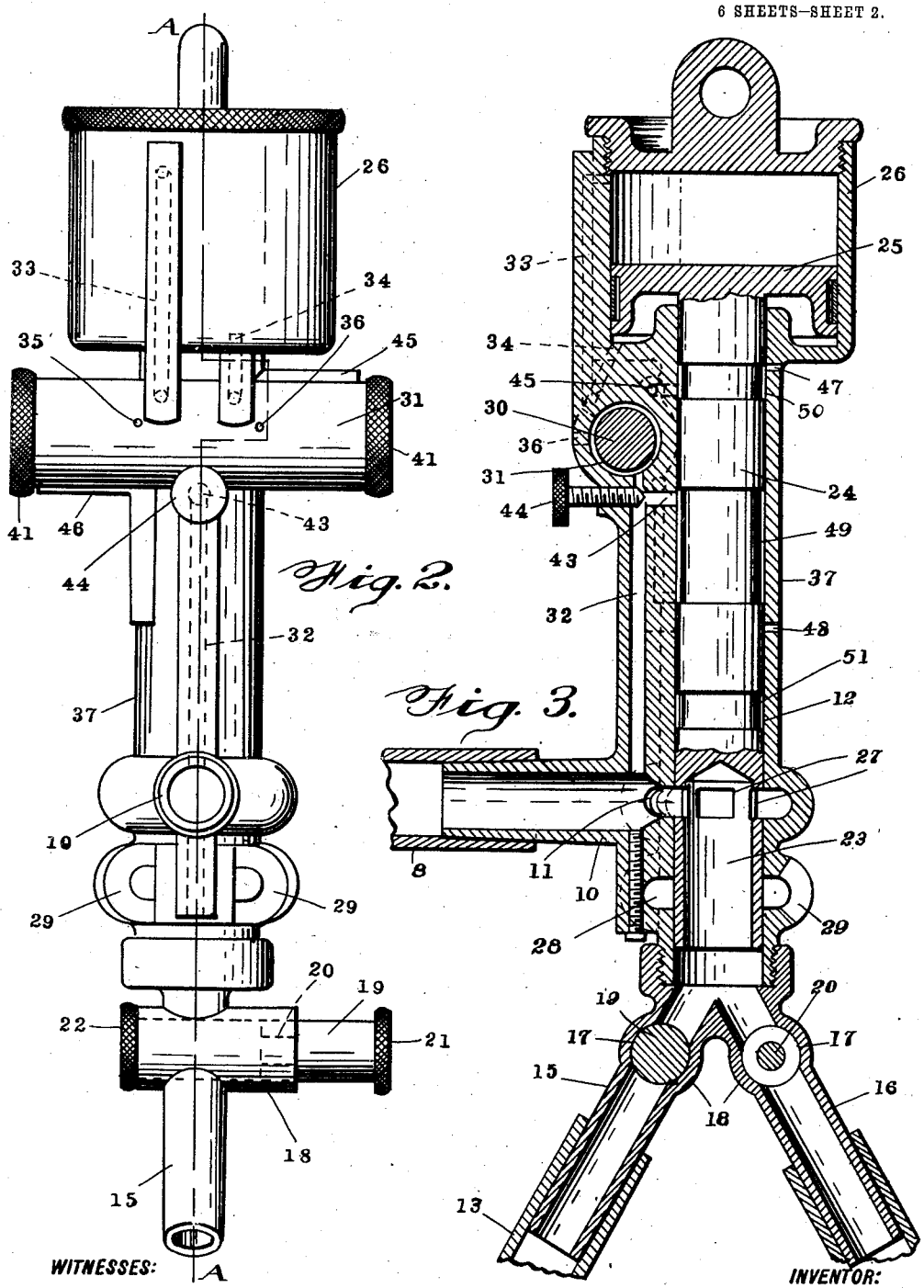

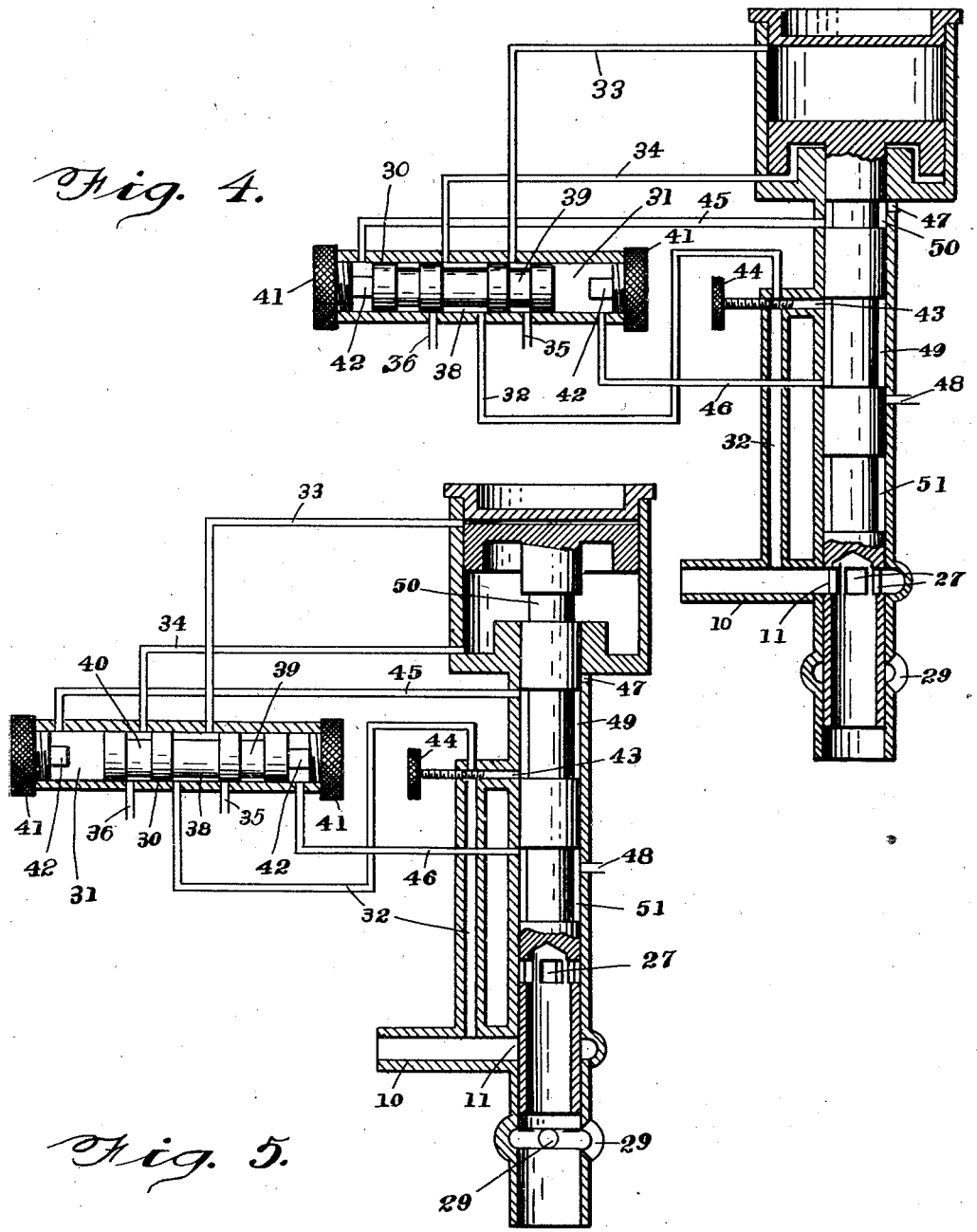

O. ANDERSON.
MILKING MACHINE.
APPLICATION FILED NOV. 1, 1912.

1,113,942.

Patented Oct. 20, 1914.
6 SHEETS—SHEET 4.

WITNESSES:
Howard P. King.
Mildred E. Brooks

INVENTOR:
Oscar Anderson,
BY
ATTORNEY.

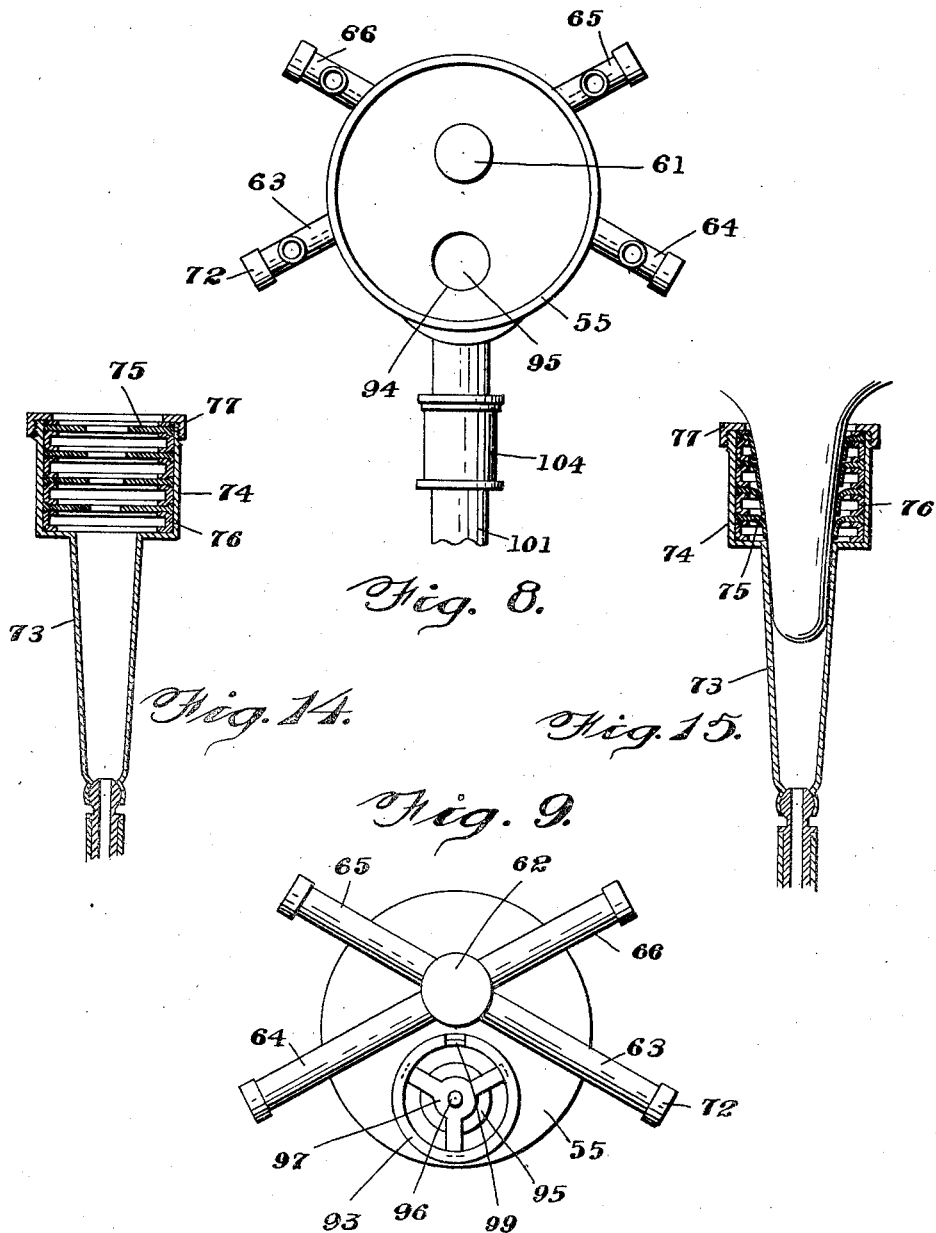

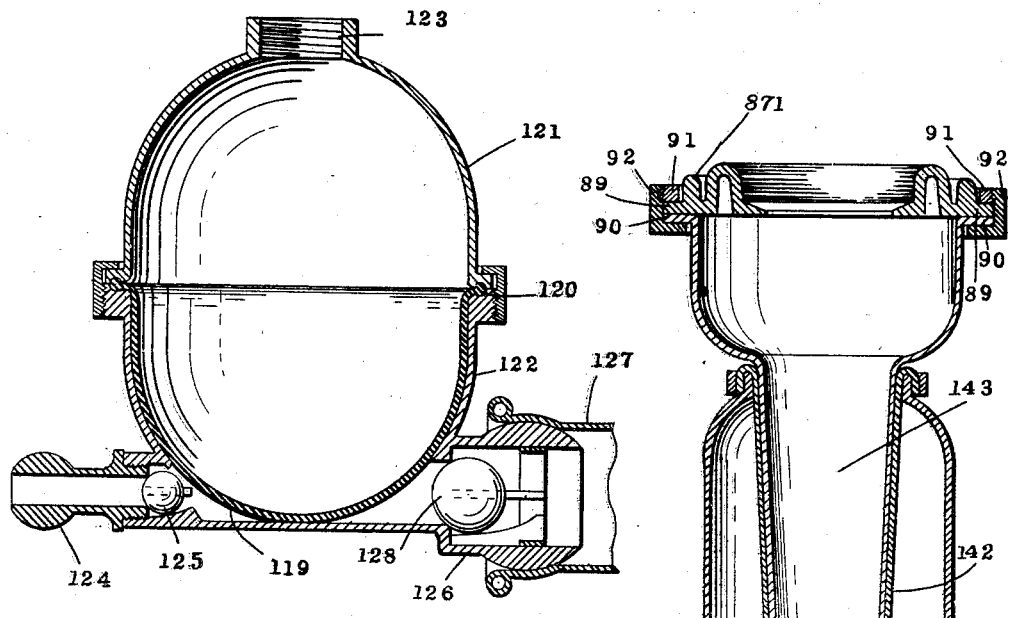
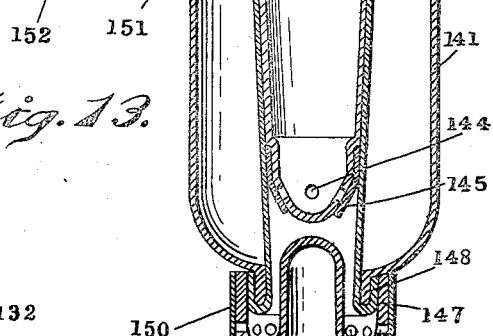
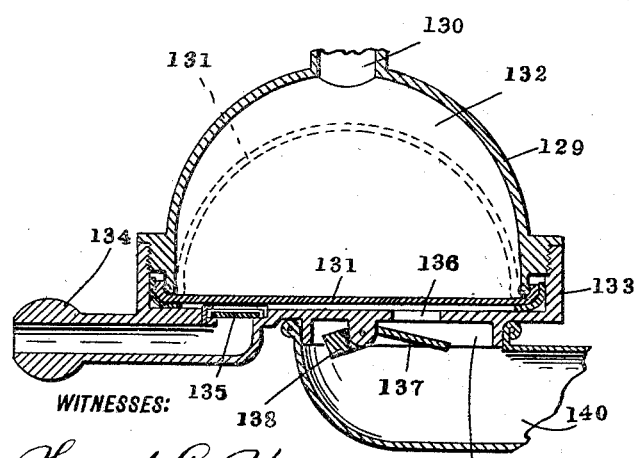

UNITED STATES PATENT OFFICE.

OSCAR ANDERSON, OF NEWARK, NEW JERSEY.

MILKING-MACHINE.

1,113,942.   Specification of Letters Patent.   Patented Oct. 20, 1914.

Application filed November 1, 1912. Serial No. 729,028.

*To all whom it may concern:*

Be it known that I, OSCAR ANDERSON, a citizen of the United States, residing at Newark, in the county of Essex and State of New Jersey, have invented certain Improvements in Milking-Machines, of which the following is a specification.

This invention relates more particularly to that form of milking machine in which a partial vacuum or decreased atmospheric pressure of intermittent application is employed to draw the milk from the teats of the cow.

The objects of the invention are to provide in such a milking machine means for producing a steady suction and a pulsator located near each cow, as opposed to a pump which is itself the pulsator; to enable the milk which has been drawn from the cow by one momentary suction to be delivered by gravity to a container or receptacle before the next suction impulse; to positively prevent the milk from entering the suction line; to do this by means of a movable partition or diaphragm; to provide an improved pulsator and motor therefor; to eliminate the use of springs in the motor; to avoid the use of rubber in contact with the milk, and particularly rubber tubes for conveying the milk; to enable the parts of the machine to be readily and easily cleaned; to secure free adjustability of the teat cups; to make the device light and yielding to the movements of the cow; to avoid working parts which shall be exposed or noisy; to secure simplicity of construction and operation; to secure improved means for imperviously connecting the teat cups to the teats; to enable the milk to be discharged into a pail or receptacle at atmospheric pressure; to secure improved discharge means, and to obtain other advantages and results as may be brought out in the following description.

Figure 1:
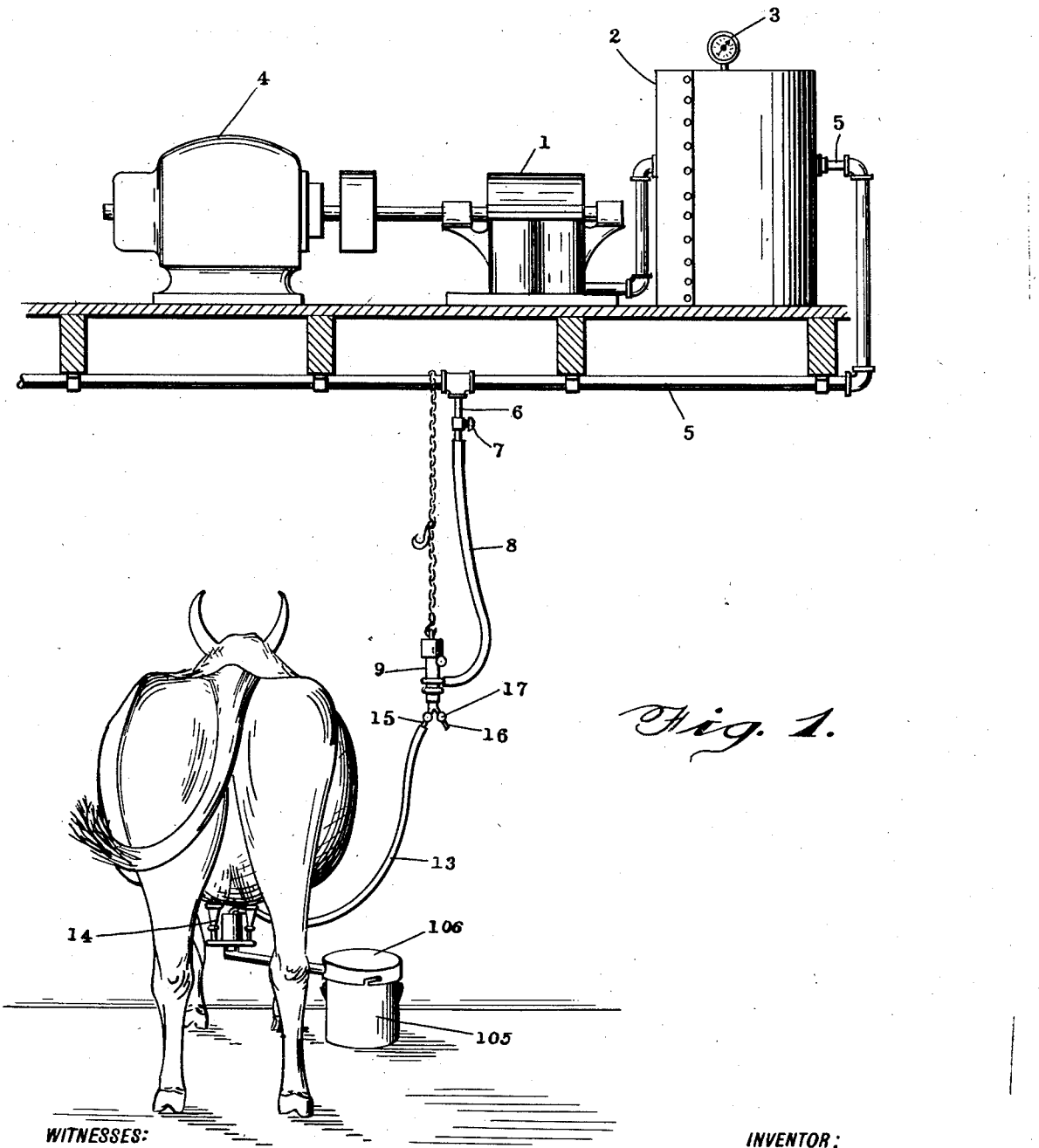
Figure 6:
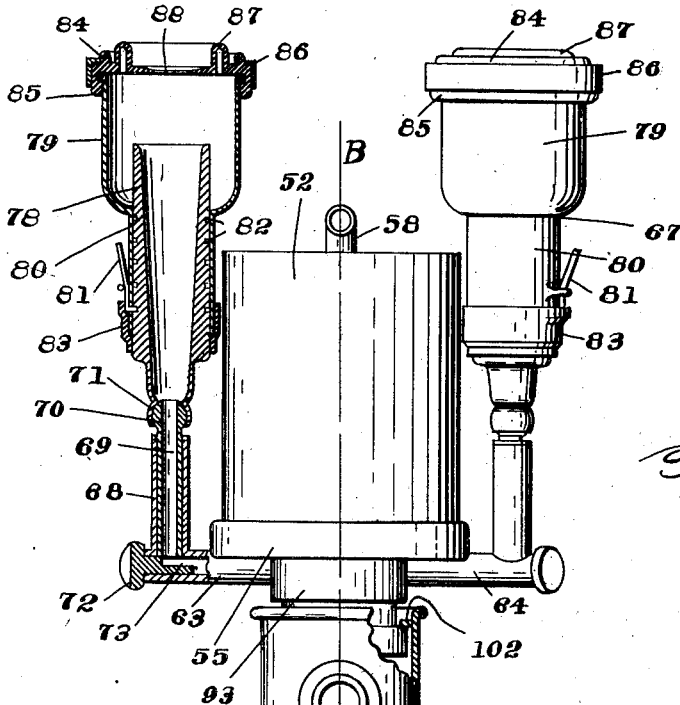
Figure 10:
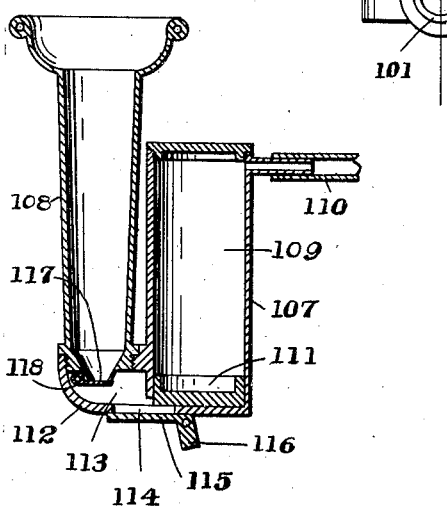
Figure 7:
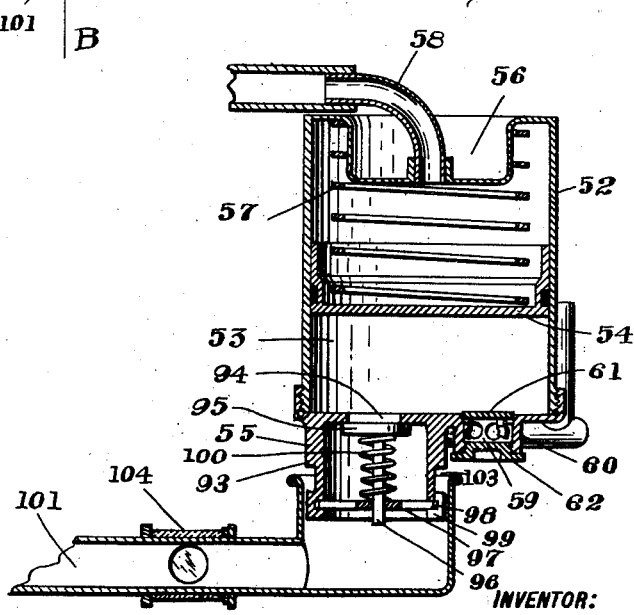

Referring to the accompanying drawings, in which like numerals of reference indicate the same parts throughout the several views, Figure 1 is an illustration of my improved milking machine, in its preferred form, connected up ready for use; Fig. 2 is a side elevation of the pulsator; Fig. 3 is a sectional view of the same taken on line A—A of Fig. 2; Fig. 4 is a diagrammatic view illustrating the operation of the pulsator, with the suction in open communication with the device for applying said suction to the cow; Fig. 5 is a diagrammatic view illustrating the operation of the pulsator, with the suction cut off from the suction device; Fig. 6 is a side elevation of the suction device, looking at its discharge spout and showing one of the teat cups in central longitudinal section; Fig. 7 is a central vertical section of said suction device taken on line B—B of Fig. 6; Fig. 8 is a plan of the suction device with the teat cups and cylinder removed; Fig. 9 is a view of the same from the bottom or underneath; Fig. 10 is a vertical section of a suction device adapted to be applied to a single teat; Fig. 11 is a sectional view of a suction device separate from the teat cups and adapted to be connected thereto, illustrating a flexible diaphragm; Fig. 12 is a similar view of a modified construction of the same, utilizing an elastic diaphragm; Fig. 13 is a vertical section of a suction device for a single teat cup embodying an elastic partition; Fig. 14 shows in vertical section a form of teat cup having a series of elastic disks at its upper part, and Fig. 15 is a similar view illustrating the same applied to a teat.

In said drawings and referring especially to Fig. 1 thereof 1 indicates a vacuum pump of any suitable and well-known construction adapted to exhaust the air from a reservoir 2 to any desired degree, as may be indicated by gage 3 thereon, said pump being driven by an electric motor 4 or any other suitable power. From said reservoir a main pipe or duct 5 leads to the stable conveniently near to the cows and has a plurality of branches 6 each provided with a valve or cock 7, and from each of said branches or connections a flexible tube 8 leads to a pulsator 9 preferably suspended from the ceiling or other suitable support close by the side of the cow to be milked. Said pulsator has near its lower end a lateral nipple 10 receiving the said flexible tube 8 and said nipple communicates at its inner end with a port 11 in the side wall of the cylindrical bore 12 of the lower part of the pulsator, said bore communicating at its lower end with means for connection to a flexible tubing 13, leading to the suction device 14 which is applied to the cow. Reference should here be had to Figs. 2 and 3 of the drawing, and in these I have shown at the lower end of the pulsator diverging nipples 15 and 16 adapted to lead each to one of two cows standing side by side, although it will be obvious that only one nipple or means for connecting a tube leading to a suction device could be employed if preferred. Each nipple 15 and 16 has a valve or cock 17 for closing or opening it, and this valve may be of any suitable and well-known form. I prefer to use, however, a valve which slides transversely of the nipples in a cylindrical casing 18, the body portion 19 having an annular reduced portion 20, which may be brought into alinement with the nipple or slid to one side thereof by means of finger pieces or heads 21 and 22 at the ends of said body portion. Communication of the suction between the lateral nipple 10 and the nipple or nipples 15 and 16, is controlled by the pulsator valve 23 which I have shown formed by the hollow cylindrical lower end of the stem 24 of a piston 25 working in a cylinder 26 at the top of the pulsator and in vertical alinement with the cylindrical bore 12 referred to. This valve 23 has ports 27 adapted to register with the port 11 before referred to, and at a lower point of the casing of the pulsator the bore 12 has an interior annular groove 28 placed in communication with the outer air by means of openings 29. When the ports 27 are in registration with the port 11, the lower part of the valve 23 closes communication with the outer air at 28 and 29, but when the ports 27 pass upward above the port 11 by movement of the piston 25 as hereinafter described, the lower end of the valve 23 exposes the said groove 28 and openings 29, so that the nipples 15 and 16 are alternately placed in communication with the suction through nipple 10 and with the atmosphere through openings 29, as will be understood. Movement of the piston 25 up and down in its cylinder 26 is effected by means of atmospheric pressure, made operative by the suction in lateral nipple 10, said suction being placed in communication with opposite ends of the cylinder 26 alternately by means of a shuttle valve 30, which, in turn, is reciprocated by atmospheric pressure made effective by admitting suction to opposite ends of said shuttle valve by the stem 24 of the piston 25. The said shuttle valve 30 is preferably arranged in a cylindrical chamber 31 located transversely at one side of the pulsator casing 37, just below the cylinder 26, although it can be placed in any other convenient position and I do not wish to be restricted in regard thereto. A duct or passage 32, preferably formed in the wall of the casing, as shown, leads from the nipple 10 upward to the middle of said chamber 31, and other ducts or passages 33, 34 lead from points of said chamber at opposite sides of its middle upwardly to the top and bottom ends of the cylinder 26 respectively. Air vents 35, 36 also lead from said chamber through its wall to the outer atmosphere at points slightly nearer the ends of the chamber than are the ducts 33, 34 last described, all as shown in Figs. 2 and 3. The shuttle valve itself is cylindrical with annular reduced portions, one at the middle, marked 38, and others 39 and 40 near the opposite ends, for purposes hereinafter more particularly described. The ends of the slide valve casing 31 are shown closed by screw plugs 41, 41, each having at its inner end a buffer 42 which may be of rubber or any other equivalent resilient construction to cushion the movement of the shuttle valve against the ends of its casing.

Referring to Fig. 4, it will be seen that when the shuttle valve stands in the position shown, namely at the left-hand end of its chamber as drawn, suction will be admitted through the duct 32, annular space 38 of the shuttle valve and duct 34, to the underside of the piston 25, and at the same time the upper side of the piston 25 will be connected through duct 33, annular space 39 of the shuttle valve and air vent 35, with the atmosphere, so that the atmospheric pressure will force the piston 25 downward as shown. On the other hand, when the shuttle valve 30 stands as shown in Fig. 5, at the right-hand end of its chamber as drawn, the suction will be in communication through duct 32, annular space 38 of the shuttle valve and duct 33 with the upper end of the cylinder 26 or above the piston 25, while the lower end of said cylinder, beneath the piston, will be connected by duct 34, annular space 40 of the shuttle valve and air vent 36, with the atmosphere, so that the atmospheric pressure will slide the piston upward, as shown.

From the upper part of the duct or passage 32 a branch 43 leads to the upright bore 12 of the pulsator casing, and preferably at this point is located an adjusting screw 44 by which the passage both to said bore 12 and to the shuttle valve chamber 31 can be regulated to govern the rapidity of action of the pulsator. A duct 45 leads from an upper portion of the bore 12, as shown in Figs. 2 and 3, longitudinally of the shuttle valve chamber 31 and opens into the same near its end as shown; also a duct 46 leads from the opposite end of the shuttle valve chamber longitudinally toward the bore 12 and then downward in the pulsator casing 37 to open into a lower part of the bore 12. Said bore also has upper and lower air vents 47, 48, and the stem 24 of the piston 25 has annular reduced portions, one in the middle marked 49 and others 50, 51 above and below the same, all so located with reference to the air vents 47, 48 and ducts 45, 46 that the stem 24 serves as a slide valve to admit suction to opposite ends of the shuttle valve 30 alternately. Again referring to Fig. 4 for illustration of this slide valve action of the piston stem 24, it will be noted that in the position of parts there shown the suction has just completed a movement of the piston 25 downward, and this movement of the piston has by means of its stem 24 placed the right-hand end of the shuttle valve in communication with the suction, instead of the left-hand end. This connection is by means of the duct 32 of the main casing, reduced portion 49 of the stem, and duct 46 to the shuttle valve, and simultaneously the left-hand end of the shuttle valve casing has been placed in communication with the air vent 47 by the upper reduced portion 50 of the stem and the duct 45. The atmospheric pressure will therefore move the shuttle valve endwise toward the right-hand as shown in the drawing, or to the position shown in Fig. 5, whereupon the piston 25 will be elevated or raised. This raising will in turn close the air vent 47 and place the duct 45 of the shuttle valve casing in communication with the suction by means of the middle reduced portion 49 of the stem; at the same time the lower reduced portion 51 of the stem will place the duct 46 of the shuttle valve casing in communication with the outlet 48 to the atmosphere. The shuttle valve will thereupon be shifted again to the left hand, as shown in Fig. 4, and the piston 25 will again descend. Obviously these actions of parts will take place in succession, over and over again, so that the pulsator valve 23 will be raised and lowered as first explained, the rapidity of movement of said pulsator valve being controlled by the regulating screw 44 described, although any other equivalent means of obtaining the same result could be employed instead of this specific form of control, if desired.

As previously stated, a flexible tube 13 leads from the pulsator to the suction or milking device which is applied to the cow and this suction or milking device in its preferred form as shown at 14 in Fig. 1 and in detail in Figs. 6, 7, 8 and 9, comprises a central body 52 shown in the form of an upright cylinder, and vertically disposed teat cups around said cylinder and projecting above the same. Said body is hollow and provides a cylindrical chamber 53 in which slides a piston-like partition 54 adapted to divide the chamber 53 into an upper air portion and a lower milk portion, between which there will be no leakage or passage of either of the fluids. In manufacturing, the sides and top of the body 52 are conveniently made in one integral piece open at the bottom and screwthreaded to connect with the base 55 and form an impervious joint by any well-known means. The top of the body portion is also preferably reëntrant at its middle portion 56, to economize space and also provide a projection into the chamber 53 around which a helical spring 57 can be seated to press against the partition 54 so as to force the same downward toward the bottom of the chamber 53 under normal atmosphereic conditions. From the reëntrant portion 56, a nipple 58 extends upward to receive the end of the tube 13 leading from the pulsator and thus afford communication with the upper portion of the chamber 53 of the body of the suction or milking device, all as clearly shown in Fig. 7 of the drawings. It will be understood that at each suction impulse transmitted to the milking device from the pulsator, the partition 54 will move upward, compressing the spring 57, and thus transmit the suction impulse to the lower portion of the chamber 53 beneath said partition 54. Also between said suction impulses, when the upper part of the chamber 53 above the partition 54, is placed in communication with the atmosphere by the pulsator, said partition 54 will move downward again by the combined effect of atmospheric pressure, the spring 57 and gravity. Upward movement of the partition 54 will therefore draw milk from the teats of the cow into said chamber 53, or the lower portion thereof, and downward movement of said partition 54 will force such milk out into a pail or other suitable receptacle, by suitable inlet and outlet means next to be described. At the same time, there can be no passage of milk past the partition 54 and it is positively prevented from getting into the suction apparatus or coming in contact with the air in such suction apparatus. The clean and sanitary effect of this is obvious, for the milking device 14 can be made of material suitable for contact with milk and which can be readily and perfectly cleaned. The pulsator 9 and tube 13 therefrom never come in contact with any milk.

In the floor of the chamber 53 of the milking device I have shown a well or depression 59 formed by an extension 60, and in the top of said well is a valve 61 adapted to open into the chamber 53, while the bottom of the well is closed by a screw plug 62. From the sides of said well or extension 60 forming the same, four tubes 63, 64, 65 and 66 extend horizontally outward beyond the body 52 of the milking device in suitable directions to lie beneath the teats of a cow, said tubes being preferably integral with the base 55 of the milking device 14 and having their bores opening into the well 59. These tubes carry at their outer ends the teat cups 67, and as their connections to said teat cups are all the same, a description of one of them will suffice. Taking for example the tube 63, said tube has at its outer end an upwardly projecting lateral branch 68 which telescopically receives the lower tubular end 69 of the teat cup and holds the same against lateral movement. Said end portion 69 preferably has a rounded head 70 to which the lower end 71 of the upper portion of the teat cup is fitted to form a ball-and-socket joint, as shown, and allow for slight movement of the teat cup with reference to the body portion of the milking device, in fittting the same to a cow. The outer end of the tube 63 may be closed in any suitable manner, but I prefer to employ a plug 72 which has an outer knurled head and an inner portion fitting the bore of the tube and extending thereinto beyond the lateral branch 68 for the teat cup. One side of this inner portion is cut away, as at 73, so as to provide communication between the branch 68 and the main part of the tube 63 when said plug is turned with the said cut-away portion next the branch and close such communication when the plug is turned half way around. Said plug therefore serves as a valve.

The preferred form of teat cup is shown in Figs. 14 and 15, where the cup has a tapered middle portion 73 adapted to fit the lower end portion of the teat and an upper enlarged portion 74 in which is located a vertical series of sheet rubber disks 75 held at their outer edges, which are preferably thickened or ribbed, as shown, and apertured at their centers to receive the teat. Preferably these disks 75 are spaced by washers or rings 76, the whole being clamped in place by a screw ring 77 at the top of the teat cup, and when applied to a teat the said disks bend inwardly downward against the same, as shown in Fig. 15, thereby aiding in securing the proper contact of the teat cup with the teat.

In the form of teat cup shown in Fig. 6, the middle portion 78 and upper enlarged end 79 are adjustable with respect to each other, said middle portion 78 being cylindrical outwardly and telescopically entering a neck 80 of the upper end portion 79. Said adjustable portions 78 and 79 are held in any position to which they are adjusted by a catch 81 pivoted on the outside of the neck 80 and adapted at one end to project through said neck into any one of a series of sockets or annular grooves 82 formed in the portion 78, and a rubber band 83 serves to make a tight joint and also hold said catch 81 in locking position. In this form of teat cup I have shown a single rubber ring or disk at the top of the enlarged portion 79, having an over-lapping flange 85 which can be reinforced by a sheet metal ring 86 separately applied to lock the rubber disk 84 in place. Said rubber disk has an upwardly projecting annular corrugation or rib 87 of inverted U shape in cross-section so that it is hollow from beneath and gives great flexibility, and inside said hollow rib 87 the disk is thinned to a central aperture 88 for the teat. Outside the said hollow rib or corrugation 87 is an annular solid rib 871. Substantially this same form of disk 84 is shown in Fig. 13, except that as there shown it has no overlapping flange 85, but a flat edge 89 adapted to lie upon the outwardly projecting flange 90 of the enlarged upper end of the teat cup and be clamped thereto by a clamping ring having an annular exteriorly threaded portion 91 to lie on the rubber disk or flange 89 thereof and a band portion 92 interiorly threaded at one end to engage said portion 91 and having at its other end an interior flange to take under the flange 90 of the enlarged portion of the teat cup.

Under some conditions, no rubber disks or disks of any kind need be used at the upper enlarged portion of the teat cup, as shown in Fig. 10.

Coming now to the milk outlet means of the milk chamber of the milking device, and referring especially to Figs. 6, 7, 8 and 9, the base 55 of the body portion 52 has preferably near its forward edge a downward extension 93 which is hollowed out from its lower end and has its interior communicating by an opening 94 through the floor of the chamber 53 with said chamber. This opening 94 is normally closed by a puppet valve 95 in the extension 93 which closes upwardly against the floor of the chamber 53, said puppet valve having a stem 96 slidable in a spider 97 whose arms are adapted to be inserted in a groove 98 in the wall of the extension through a slot 99 opening from said groove out through the end of said extension, and a spring 100 being around said stem between the said spider 97 and the valve 95 to normally hold the latter closed. A discharge tube 101 is provided with an elbow at one end whose opening is large enough to slip over the extension 93, and said elbow has two diametrically opposite interior pintles 102 which project into a groove 103 around the outside of the extension, said pintles being inserted into said groove by means of the same slot 99 which enables the spider 97 to be inserted into the interior groove 98. The said pintles 102 preferably lie in a line transverse to the discharge tube 101, so that said tube can swing up and down, and the elbow of the discharge tube preferably fits loose upon the extension 93 of the body portion of the milking device so that more or less relative movement and adjustment is permitted. A sight glass 104 may be provided in the discharge tube 101 and said tube leads to a receptacle 105, see Fig. 1, which is preferably provided with a cover 106 secured in place by a bayonet joint or equivalent means, but is not sealed, air-tight and into which the milk is delivered at atmospheric pressure.

It will be understood that my improved milking device is preferably supported, as shown, entirely by the operative connection of the teat cups with the teats of the cow, although I do not wish to preclude the use of a strap or other means for supporting it in any other way, if it should be found, desirable.

While I prefer the arrangement of milking device which I have already described, that is to say, with a central body portion 52 and teat cups around the same, I may under some conditions have an individual body portion 107 for each teat cup 108, as shown in Fig. 10. In that case, the suction communicates with the upper portion of the chamber 109 of the body portion by a suitably flexible branch tube 110 and in said chamber 109 is a slidable partition 111 corresponding to the partition 54 in the construction already described. The lower part of the body 107 has a lateral extension 112 into the top of which the teat cup 108 is seated, preferably removable as by screwing. Said teat cup thus opens at its lower end into the chamber 113 of the extension, which chamber communicates with the lower end of the chamber 109 and furthermore has at its bottom a discharge outlet 114 controlled by an outwardly opening valve 115. Said valve 115 is normally held closed, as by a weight 116, although it will open under the weight of accumulating milk to discharge the same. There is also a valve 117 at the lower end of the teat cup pivoted as at 118 and adapted to open into the chamber 113. It will be understood that the operation of this milking device for a single teat is substantially the same as the milking device already described for all the teats together, suitable means being provided to receive the discharged milk, such as a cup or funnel (not shown) adapted to extend under all four of the devices.

In Figs. 11, 12 and 13 I have shown a milking device or suction device in which a flexible diaphragm is employed instead of a movable partition, and referring especially to Fig. 11, 119 indicates such a flexible diaphragm secured at its edge 120 between the clamped edges of the upper and lower sections 121, 122 of a body portion for the milking device. Said body portion is shown as providing a chamber whose upper and lower halves formed by the sections 121, 122 are similar, and the diaphragm 119 is of substantially the same shape as one of said halves and adapted to fit therein. Normally said diaphragm lies in the lower section 122 of the body portion, as shown, but under the influence of suction introduced through the opening 123 at the top of the body portion, said diaphragm will move upwardly to a greater or less extent to produce a corresponding suction in the teat cups. The body portion may be connected to the teat cups in any desired manner but for convenience I have shown the lower part of the body portion provided with a lateral nipple 124 which is adapted to be connected by suitable coupling means with a set of teat cups such as shown in my prior application dated June 21, 1911, Serial No. 634,399. At the inner end of said nipple 124 is a ball valve 125 adapted to close against the same, and at the opposite side of the body portion is another lateral connection 126 for the milking discharge 127, this connection 126 being also provided with a ball valve 128 adapted to close toward the body portion. Obviously any other kind of valves could be used therein.

In Fig. 12 I have shown a body portion 129 having a suction opening 130 at its top and an elastic diaphragm 131 across its bottom so that as the chamber 132 is placed in communication with suction the diaphragm 131 will stretch upwardly as shown by dotted lines to produce a corresponding suction in the teat cups. The base 133 of the body portion has at one side a nipple 134 corresponding to the nipple 124 shown in Fig. 11 and at the inner end of the passage of said nipple is a valve 135 adapted to open toward the chamber of the body portion. Said base also has in its floor a milk outlet 136 and at the underside of said floor is a valve 137 adapted to normally close upward under the influence of its weighted end 138. Furthermore, said base has around said outlet 136 and its valve 137 a depending annular flange 139 or other suitable means for connection of the milk discharge tube 140.

In Fig. 13 I have shown a flexible diaphragm applied to an individual suction device or suction device for a single teat, the body portion 141 of this device being elongated with openings at its upper and lower ends between which extends a tubular flexible diaphragm 142, said diaphragm being removable but imperviously secured at its extremities in said openings. The teat cup 143 is then seated in said body portion 141, depending into the tubular diaphragm 142 as shown, and the lower end of said teat cup has apertures 144 normally closed by outwardly opening valve means, such as the flexible rubber band 145 shown in the drawing. A base or cap 146 for the bottom of the suction device has an annular flange 147 adapted to fit tightly and preferably removably over the lower neck 148 of the body portion, and said base or cap has at its lower part discharge outlets 149 normally closed by outwardly opening valve means, such as the rubber band 150 upon the outside of the base over said outlets. At one side of the body portion 141 is a nipple 151 for receiving the branch suction tube 152, and it will be understood that as the suction is admitted the tubular diaphragm 142 will expand at its middle portion between its secured ends and thus produce a corresponding suction in the teat cup and in the base 146 below said teat cup, so that milk will flow into said base. When suction is cut off, the tubular diaphragm will contract and force the accumulated milk through the outlet 149, the valve 145 preventing its return to the teat cup. Any suitable means, such as described in connection with Fig. 10, may be employed for collecting the milk from all the teat cups employed on the cow.

It will be understood that various changes involving only selection and mechanical skill may be made in determining upon the exact form of my invention which will be best adapted to any special condition, and I do not wish to be understood as restricting myself by anything which I have positively shown herein to illustrate my invention except as set forth in the following claims when construed in the light of the prior art.

It will be noted that by my invention I provide a suction or milking device which is compact and embodies in itself only the teat cups and milk discharge means, so that it can hang from the cow supported only by its engagement with the teats, thus avoiding the use of additional supporting means. Furthermore, the discharge tube from said suction or milking device can swing freely, either up or down or from side to side, so that movements of the cow will not displace it. The entire suction or milking device is simple and readily taken apart and put together again in cleaning; all its parts are accessible for washing and scalding, and in its preferred form there is no rubber to come in contact with milk.

The pulsator in my improved milking apparatus, is entirely separate from the suction or milking device, as well as from the vacuum producing apparatus, and can be arranged wherever most convenient and connected by a hose or flexible tubing. Because of the movable partition or diaphragm in the suction or milking device no milk can pass to the pulsator or tube connecting the same, and thus there is no danger of milk being drawn into the pulsator or its tube. Furthermore, the air by which variations in pressure are transmitted to the suction or milking device, never comes in contact with the milk, because of said partition or diaphragm, and since this air must ordinarily be the stable air greatly increased santiary condition of the milk is obtained.

The pulsator of my improved construction contains no springs or similar parts liable to get out of order or require adjustment, and it has no working parts which are exposed to become damaged or be tampered with. It is compact, with all its working parts inclosed, and its action is free from noise such as would annoy or excite the cows. The action of the pulsator is automatic and does not depend upon any exact position of the pulsator, although preferably it is suspended as shown in the drawings.

The teat cups forming a feature of my invention, especially in their preferred form, are extremely simple, and yet effective in securing a firm and impervious connection with the teats. Furthermore, they can be easily taken apart and thoroughly cleansed, and if the rubber disks become impaired they can be readily and inexpensively renewed. It should also be noted that my improved milking apparatus delivers the milk into a receptacle under the atmospheric pressure or under perfectly normal conditions, and that the milk is delivered between successive pulsations or suction impulses, similar to milking by hand, and does not accumulate in the suction device to any material extent. The preferred form of teat cup referred to above also simulates very closely the action of the human hand upon the teat in milking. I also enable the teat cups to bend freely with respect to the suction or milking device by their jointed connection therewith which has been shown and described, so that their engagement with and action upon the teats is easy and natural.

Having thus described the invention, what I claim as new is:—

1. In a milking machine, the combination of means for producing a partial vacuum, a suction device adapted to be applied to a cow, a pulsator alternately placing said suction device in communication with said partial vacuum and the atmosphere, means for preventing the milk from passing from said suction device to the vacuum producing means, and means for discharging the milk from said suction device into the atmosphere.

2. In a milking machine, the combination of means for producing a partial vacuum, a suction device adapted to be applied to a cow, a pulsator alternately placing said suction device in communication with said partial vacuum and the atmosphere, a movable partition for preventing milk from passing from said suction device to the vacuum producing means, and means for discharging the milk from said suction device into the atmosphere.

3. In a milking machine, a body portion providing a chamber, means for exhausting air from one end of said chamber, means at the other end of said chamber for admitting milk to said chamber, means also at said last-mentioned end of the chamber for discharging milk into the atmosphere, and a partition extending transversely of said chamber between its said ends and adapted to move under variations of air pressure in said chamber.

4. In a milking machine, a body portion providing a chamber, means for exhausting air from one end of said chamber, means at the other end of said chamber for admitting milk to said chamber, means also at said last-mentioned end of the chamber for discharging milk into the atmosphere, and a partition extending transversely of said chamber between its said ends and slidably engaging the walls thereof.

5. In a milking machine, a body portion providing a chamber, means for exhausting air from one end of said chamber, means at the other end of said chamber for admitting milk to said chamber, means also at said last-mentioned end of the chamber for discharging milk into the atmosphere, and a slidable transverse partition between said ends of the chamber imperviously engaging the side walls thereof.

6. In a milking machine, a body portion providing a chamber, means for exhausting air from one end of said chamber, means at the other end of said chamber for admitting milk to said chamber, means also at said last-mentioned end of the chamber for discharging milk into the atmosphere, a partition extending transversely of said chamber between its said ends adapted to move under variations of air pressure in said chamber, and a spring between said partition and one end of said chamber.

7. In a milking machine, a body portion providing a cylindrical chamber, means for exhausting air from one end of said chamber, means at the other end of said chamber for admitting milk, means also at said last-mentioned end of the chamber for discharging milk into the atmosphere, and a piston-like partition in said cylindrical chamber between its said opposite ends.

8. In a milking machine, a teat cup comprising a lower portion adapted to fit against the teat and an upper enlarged portion, an elastic disk in said upper enlarged portion having an annular hollow corrugation, and means for holding the edge of said disk.

9. In a milking machine, a teat cup having an upper enlarged portion, an elastic disk in said upper enlarged portion having an annular rib and an inner concentric hollow corrugation, and means for clamping the edge of said disk.

10. In a milking machine, a teat cup comprising a lower portion adapted to fit against the teat and an upper and enlarged portion adjustable with respect to the lower portion and a resilient sleeve overlapping both said portions at their joint and making said joint tight.

11. In a milking machine, a teat cup comprising a lower portion adapted to fit against the teat and an upper enlarged portion, said portions being longitudinally adjustable with respect to each other, means for locking the said portions in any relation to which they are adjusted and a resilient sleeve overlapping both said portions at their joint and holding the locking member locked.

12. In a milking machine, a teat cup having a lower portion adapted to fit against the teat and an upper enlarged portion longitudinally adjustable with respect thereto, means for locking said portions in adjusted position, and means for securing a tight joint between them.

13. In a milking machine, a suction device having diverging tubes each open at its end and provided adjacent thereto with a branch tube adapted to receive a teat cup, and means inserted in the end of each tube extending past the said branch and having an outer handle for opening and closing communication between the tube and its branch.

14. In a milking machine, a suction device having diverging tubes each open at its end and provided adjacent thereto with a branch tube adapted to receive a teat cup, and a plug inserted in the end of each tube extending past the said branch and having an outer handle, one side of the inner portion of said plug being cut away to provide communication between the tube and its branch when the plug is turned into proper position.

15. In a milking machine, a suction device comprising a central body portion interiorly chambered, and a series of tubes radiating from the base of said body portion, teat cups mounted on said tubes and extending upward at the sides of said body portion above the same, milk discharge means connected to the base of said body portion, a suction tube at the top of said body portion leading to the chamber thereof and a transverse partition in said chamber above the milk tubes and discharge means and below the suction tube adapted to move under variations of air pressure in the chamber.

16. In a milking machine, a suction device comprising a central body portion interiorly chambered and having a well in its floor with ducts radiating therefrom, teat cups connected to said ducts and extending upward above the body portion outside the same, a valve at the upper part of said well adapted to open toward the chamber of the body portion, and milk discharge means leading from said chamber downward at the base of the body portion.

17. In a milking machine, a suction device comprising a chambered body portion having at its base a hollow extension communicating with the chamber of the body portion by an opening in the floor thereof, a valve for said opening normally held closed toward the chamber, a discharge tube having an enlarged end adapted to receive said extension, and means for connecting said tube to said extension so as to allow relative motion.

18. In a milking machine, a suction device comprising a chambered body portion with a valved discharge extension, a discharge tube having an end adapted to telescopically receive said extension, and means at opposite sides of the said extension and telescoping end of the discharge tube for pivotally connecting them against longitudinal separation.

19. In a milking machine, a suction device comprising a chambered body portion with a valved discharge extension, and a discharge tube having an end adapted to telescopically receive said extension, said extension and tube end having at their adjacent surfaces one an annular groove with a longitudinal slot opening thereinto and the other diametrically opposite pintles adapted to project into said grooves.

20. In a milking machine, a suction device comprising a chambered body portion having tubes projecting from its base at both sides and adjacent to the rear of the body portion, teat cups connected to said tubes and extending upward above the body portion, and a milk discharge tube connected to the base of said body portion adjacent to its front and between its sides.

21. In a milking machine, a body portion providing a chamber, means for exhausting air from said chamber, means for admitting milk to said chamber, means for discharging milk from said chamber into the atmosphere, and a partition imperviously dividing said chamber between the air exhausting means and the milk inlet and outlet means and adapted to move under variations of air pressure in the chamber.

22. In a pulsator, a single member forming a piston and a slide valve, a casing providing a single chamber for said piston and slide valve member, means for supplying to said casing fluid at a pressure other than atmospheric pressure, and a shuttle valve in connection with said fluid supply means adapted when at opposite ends of its reciprocation to admit the fluid to correspondingly opposite ends of the piston, the piston slide valve adapted when at its opposite ends of its reciprocation to admit the fluid to opposite ends of the shuttle valve and cause it to reverse its position.

23. In a milking machine, a pulsator having a casing with a tubular bore enlarged at one end to form a cylinder and provided near its opposite end with an inlet port and with an outlet port opening to the atmosphere, a piston in said cylinder having a stem forming a slide valve in said bore and having a ported end adapted to alternately open and close said inlet port and outlet port as the piston reciprocates, suction supply means in communication with said inlet port and slide valve portion of the bore and opposite ends of the cylinder, and a shuttle valve for controlling the suction supply to the cylinder and exhaust therefrom, said shuttle valve chamber being connected to the bore of the pulsator casing so that the piston stem will at the ends of its reciprocations admit suction to opposite ends of the slide valve alternately.

24. In a milking machine, a pulsator having a casing with a shuttle valve chamber, a tubular bore enlarged at one end to form a cylinder, and provided at its opposite end with an inlet port and an outlet port and having a pipe connection in communication with said inlet port and slide valve portion of the bore and shuttle valve chamber, said shuttle valve chamber being connected by suitable ducts with opposite ends of the cylinder and having its own opposite ends connected to the tubular bore of the casing, a shuttle valve in said shuttle valve chamber adapted to admit to and exhaust from alternate ends of the cylinder, and a piston in said cylinder having a stem in said bore forming a slide valve adapted to admit to and exhaust from alternate ends of the shuttle valve chamber and having a ported end controlling the inlet and outlet ports of the pulsator.

25. In a milking machine, a pulsator having a casing with a tubular bore enlarged at one end to form a cylinder and provided near its opposite end with an inlet port and a port open to the atmosphere, means for supplying suction to said inlet port and conducting it from the extremity of the bore of the casing, a duct leading from said inlet port to the slide valve portion of the bore and to the opposite ends of the cylinder, a piston in said cylinder having a stem forming a slide valve in said bore and having a ported end adapted to control the said inlet and outlet ports of the casing, and a shuttle valve for controlling the inlet to and exhaust from the cylinder through said duct, the chamber for said shuttle valve being connected to the bore of the pulsator casing, so that at the ends of its reciprocation the piston stem will admit to and exhaust from the opposite ends of the shuttle valve alternately.

26. A pulsator having a casing with a tubular bore enlarged at one end to form a cylinder, a piston in said cylinder having a stem forming a slide valve in said bore, means for supplying fluid at a pressure other than atmospheric pressure both to the slide valve portion of the bore and to the opposite ends of the cylinder, and a shuttle valve for admitting and exhausting the fluid at opposite ends of the cylinder alternately, the opposite ends of the shuttle valve chamber being connected to the slide valve portion of the bore of the casing so that the piston stem will admit and exhaust at opposite ends of the shuttle valve alternately.

27. A pulsator having a casing with a shuttle valve chamber, a tubular bore enlarged at one end to form a cylinder and a pipe connection in communication with said bore and shuttle valve chamber, said shuttle valve chamber being connected by suitable ducts with opposite ends of the cylinder and having its own opposite ends connected to the tubular bore of the casing, a shuttle valve in said shuttle valve chamber adapted to admit and exhaust at opposite ends of the cylinder alternately, and a piston in said cylinder having a stem in said bore forming a slide valve adapted to alternately admit and exhaust at opposite ends of the shuttle valve chamber.

28. A pulsator having a casing with a shuttle valve chamber, a tubular bore enlarged at one end to form a cylinder and a pipe connection in communication by a branched passage with said bore and shuttle valve chamber, said shuttle valve chamber being connected by suitable ducts with opposite ends of the cylinder and having its own opposite ends connected to the tubular bore of the casing, a shuttle valve in said shuttle valve chamber adapted to admit and exhaust at opposite ends of the cylinder alternately, a piston in said cylinder having a stem in said bore forming a slide valve adapted to alternately admit and exhaust at opposite ends of the shuttle valve chamber, and means at the junction of the branch passages leading from the pipe connection for controlling both said passages.

29. A pulsator having a casing with a tubular bore enlarged at one end to form a cylinder, a shuttle valve chamber at substantially right angles to said bore below the cylinder and a pipe connection in communication by a branched passage with both said bore and shuttle valve chamber, said shuttle valve chamber being connected by suitable ducts with opposite ends of the cylinder and having its own opposite ends connected to the tubular bore of the casing, a shuttle valve in said shuttle valve chamber adapted to admit and exhaust at opposite ends of the cylinder alternately, and a piston in said cylinder having a stem in said bore forming a slide valve adapted to alternately admit and exhaust at opposite ends of the shuttle valve chamber.

30. A pulsator having a piston with a stem, forming a slide valve, a casing with a chamber providing slideways of different diameters for said piston and stem, means for supplying to said casing fluid at a pressure other than atmospheric pressure, and a shuttle valve in connection with said fluid supply means adapted when at opposite ends of its reciprocation to admit the fluid to correspondingly opposite ends of the piston, the piston slide valve adapted when at its opposite ends of its reciprocation to admit the fluid to opposite ends of the shuttle valve and cause it to reverse its position.

31. In a milking machine, a pulsator having a suction inlet connection, an outlet connection with a plurality of branches and a port to the atmosphere, means for discharging alternately through said atmospheric port and outlet connection, and a transversely sliding valve in each branch of said outlet connection adapted to open and close the same.

32. In a milking machine, a teat cup having an upper enlarged portion, an elastic disk in said upper enlarged portion having an annular rib and an inner concentric hollow corrugation, said disk having a central aperture and tapering in thickness radially from said corrugation to the edge of the aperture, and means for clamping the edge of said disk.

OSCAR ANDERSON.

Witnesses:
RUSSELL M. EVERETT,
HOWARD P. KING.